(12) United States Patent
Löffler

(10) Patent No.: US 11,932,061 B2
(45) Date of Patent: Mar. 19, 2024

(54) ELECTRONIC WHEEL UNIT FOR ARRANGEMENT ON A VEHICLE WHEEL

(71) Applicant: Continental Automotive Technologies GmbH, Hannover (DE)

(72) Inventor: Michael Löffler, Zeitlarn (DE)

(73) Assignee: Continental Automotive Technologies GmbH, Hannover (DE)

( * ) Notice: Subject to any disclaimer, the term of this patent is extended or adjusted under 35 U.S.C. 154(b) by 34 days.

(21) Appl. No.: 17/759,670

(22) PCT Filed: Dec. 4, 2020

(86) PCT No.: PCT/EP2020/084699
§ 371 (c)(1),
(2) Date: Jul. 28, 2022

(87) PCT Pub. No.: WO2021/151564
PCT Pub. Date: Aug. 5, 2021

(65) Prior Publication Data
US 2023/0079930 A1 Mar. 16, 2023

(51) Int. Cl.
*B60C 23/04* (2006.01)
(52) U.S. Cl.
CPC ........ *B60C 23/041* (2013.01); *B60C 23/0411* (2013.01); *B60C 23/0459* (2013.01); *B60C 23/0488* (2013.01)
(58) Field of Classification Search
CPC .................. B60C 23/041; B60C 23/0411
See application file for complete search history.

(56) References Cited

U.S. PATENT DOCUMENTS

2002/0088517 A1 7/2002 Shimura
2005/0140212 A1 6/2005 Hamel et al.
(Continued)

FOREIGN PATENT DOCUMENTS

| CA | 3088867 C | * | 8/2023 | ............... E06B 9/38 |
|---|---|---|---|---|
| CN | 108608815 A | | 10/2018 | |
| DE | 102007010505 A1 | | 9/2008 | |
| DE | 102009059788 A1 | | 6/2011 | |

(Continued)

OTHER PUBLICATIONS

German Office Action dated Mar. 26, 2020, for the counterpart German Patent Application No. 10 2020 201 026.9.
(Continued)

*Primary Examiner* — Adi Amrany

(57) ABSTRACT

An electronic wheel unit for arrangement on a vehicle wheel of a vehicle, having at least one sensor for detecting at least one wheel operational parameter, a control device, which is designed to generate wheel operational data on the basis of the at least one wheel operational parameter, a radio device for transmitting radio data signals containing the wheel operational data, a power supply device for supplying electrical power to the wheel unit which has an energy-harvesting device for converting mechanical energy captured on a rotation of the vehicle wheel into electrical energy and an electric battery, wherein the electronic wheel unit furthermore has a switchover device for switching over between the energy-harvesting device, and the electric battery for the electrical power supply to the wheel unit, and the switchover device has an actuable switch and an actuating device for actuating the switch, wherein the at least one wheel operational parameter comprises an acceleration parameter, and the actuating device effects the switchover depending on the acceleration parameter or a parameter derived therefrom.

5 Claims, 2 Drawing Sheets

(56) References Cited

U.S. PATENT DOCUMENTS

| | | | |
|---|---|---|---|
| 2005/0258949 A1* | 11/2005 | Iwazumi | B60C 23/0462 |
| | | | 340/442 |
| 2007/0180894 A1* | 8/2007 | Shimura | B60C 23/041 |
| | | | 73/49 |
| 2009/0299570 A1* | 12/2009 | Kammann | B60C 23/0459 |
| | | | 701/36 |
| 2010/0141417 A1 | 6/2010 | Boes | |
| 2011/0001493 A1 | 1/2011 | Lohndorf et al. | |
| 2012/0169142 A1 | 7/2012 | Lee et al. | |
| 2012/0259507 A1 | 10/2012 | Fink | |
| 2012/0261991 A1 | 10/2012 | Tatar et al. | |
| 2017/0040911 A1 | 2/2017 | Tatarchuk et al. | |
| 2019/0092104 A1* | 3/2019 | Ahmed | G06F 1/3287 |
| 2019/0214845 A1* | 7/2019 | Hausman, Jr. | H02J 9/061 |

FOREIGN PATENT DOCUMENTS

| | | |
|---|---|---|
| DE | 102015212945 A1 | 1/2017 |
| EP | 1623849 A2 | 2/2006 |
| JP | 2000272312 A | 10/2000 |
| JP | 2005324748 A | 11/2005 |
| JP | 2012206562 A | 10/2012 |

OTHER PUBLICATIONS

The International Search Report and the Written Opinion of the International Searching Authority dated Dec. 4, 2020, for the counterpart PCT Application No. PCT/EP2020/084699.

Office Action dated Nov. 28, 2023, from corresponding Chinese patent application No. 202080095073.7.

* cited by examiner

ELECTRONIC WHEEL UNIT FOR ARRANGEMENT ON A VEHICLE WHEEL

CROSS-REFERENCE TO RELATED APPLICATIONS

The present application is a National Stage Application under 35 U.S.C. § 371 of International Application No. PCT/EP2020/084699 filed on Dec. 4, 2020, and claims priority from German Patent Application No. DE 102020201026.9, filed on Jan. 29, 2020, in the German Patent and Trade Mark Office, the disclosures of which are herein incorporated by reference in their entireties.

BACKGROUND

1. Field

The present application relates to an electronic wheel unit.

2. Description of Related Art

Such wheel units for arrangement on a vehicle wheel of a vehicle are known in various embodiments and have at least one sensor (for example acceleration sensor, pressure sensor, temperature sensor, etc.) for detecting at least one wheel operational parameter (for example acceleration, tire pressure, tire temperature, etc.), a control device provided for generating wheel operational data on the basis of the at least one wheel operational parameter, a radio device for transmitting radio data signals containing the wheel operational data, and a power supply device (for example electric battery) for the electrical power supply to the wheel unit.

One disadvantage with the wheel units which are conventionally supplied power using an electric battery is the limited life of the battery and therefore the need for a regular replacement of this battery or of the entire wheel unit.

As an alternative to the electrical power supply to the wheel unit by means of a battery, it has already been proposed to achieve the electrical power supply by means of an "energy-harvesting device", with which mechanical energy is captured on a rotation of the vehicle wheel and converted into electrical energy.

One disadvantage with such wheel units, however, is the fact that the energy supply is not consistently ensured (but rather only when there is sufficient energy harvesting) and therefore that the wheel unit's functionality is not consistently enabled.

Against this background, it has already been proposed to achieve the electrical power supply to a wheel unit by means of an electrical energy store (rechargeable electric battery) fed by an energy-harvesting device.

One disadvantage with such wheel units, however, is the high level of cost expenditure, on the one hand for an energy-harvesting device which needs to be provided so as to be relatively high-power for this purpose and on the other hand for the electrical energy store.

SUMMARY

An object of the present disclosure in the case of an electronic wheel unit of the type mentioned at the outset is to enable both a long operational readiness and a consistent electrical power supply in a cost-effective manner.

In accordance with the present disclosure, this object is achieved by an electronic wheel unit as claimed in claim 1. The dependent claims relate to advantageous developments of the disclosure.

Provision is made according to the disclosure for the power supply device to have an energy-harvesting device for converting mechanical energy captured on a rotation of the vehicle wheel into electrical energy and an electric battery and for the wheel unit to be designed to provide the electrical power supply by means of the energy-harvesting device in the case of sufficient generation of electrical energy by the energy-harvesting device and to provide the electrical power supply by means of the electric battery in the case of an insufficient generation of electrical energy by the energy-harvesting device.

If the electronic wheel unit according to the disclosure is equipped, for example, with a non-rechargeable electric battery which is dimensioned as in the case of conventional wheel units, the time of operational readiness is considerably extended. Alternatively, in this case, however, for example an increased power (for example radio transmission power, frequency of detections and/or frequency of the radio data signal transmissions) in comparison with the conventional systems can also be provided. Even though in the case of the disclosure the "electric battery" is preferably a non-rechargeable battery, the use of a rechargeable battery will not be ruled out at this juncture. Besides, in accordance with one development of the disclosure, provision is made for an electrical energy generated by the energy-harvesting device to be buffer-stored by means of a rechargeable battery arranged at an output of the energy-harvesting device and therefore, for example, for an electrical DC voltage output by the energy-harvesting device, for example after voltage rectification, to be buffer-stored.

According to the disclosure, provision is made for the wheel unit to furthermore have a switchover device for switching over between the energy-harvesting device and the electric battery for the electrical power supply to the wheel unit.

Thus, an "intelligent" (demand-based) switchover between the two power supplies (energy harvesting and electric battery) can be realized.

Advantageously, recourse can be taken, in respect of the specific design of the energy-harvesting device used in the disclosure, to the prior art in this regard. In particular, the energy-harvesting device can have, for example, a movable (owing to the action of acceleration forces) mass (which is also possibly moveable is such a way as to be deflectable out of a zero position, for example, under spring-loading) and a converter device which is arranged opposite in such a way as to be stationary (with respect to the wheel unit) for converting this movement into electrical energy or an electrical voltage. The converter device can have, for example, a piezoelectric material which is acted upon by the mass. In the case of the use of a permanent magnet as movable mass, the converter device can have, for example, an induction coil. A rectifier circuit (for example bridge rectifier) can be provided at the output of the converter device in order to provide a DC voltage required for the voltage supply to the wheel unit.

In the case of the wheel unit according to the disclosure, the mentioned acceleration forces arise on each rotation of the vehicle wheel in question, wherein, in practice, in general the more electrical energy that can be generated by the energy-harvesting device, the more quickly the wheel is rotating or the vehicle is travelling. A consideration here is that energy-harvesting devices of the type of interest here are often designed primarily to utilize the oscillations or vibrations of the wheel unit typically occurring at relatively high vehicle speeds (and to a lesser extent the variation in the gravitational force which is dependent on the wheel angle of rotation) in order to generate the electrical energy.

In one advantageous development, a rechargeable electric battery is provided at one output of the energy-harvesting device, downstream of a rectifier circuit, for buffer-storing the generated electrical energy or therefore buffer-storing the DC voltage generated by the energy-harvesting device.

Provision is made according to the disclosure for the abovementioned switchover device to have an actuatable switch and an actuating device for actuating the switch.

The switch can be in the form of a semiconductor switch (for example transistor), for example, or can comprise such a semiconductor switch. The switch can be designed to have one pole or, for example, two poles (for example formed from two semiconductor switches).

Provision is furthermore made according to the disclosure for the at least one wheel operational parameter (detected by the sensor(s)) to comprise an acceleration parameter and for the actuating device to effect the switchover depending on the acceleration parameter or a parameter derived therefrom.

In this case, for example, a radial acceleration (acting at the attachment location of the wheel unit) can be provided as acceleration parameter. Alternatively, the acceleration parameter can represent, for example, a tangential acceleration (or another acceleration). In addition, the intensity of a "vibration" at the attachment location of the wheel unit or the intensity of a "shock" (short-term severe variations in the acceleration) at the attachment location of the wheel unit, as typically occur during a wheel rotation each time the wheel unit passes through the region of a tire contact area and can be measured using a vibration or shock sensor, can also be provided as acceleration parameter.

A parameter determined by means of a mathematical calculation or an algorithm using the detected acceleration parameter (including, for example, the time characteristic thereof), such as, for example, an acceleration intensity measure such as, for example, a mean value of an absolute value of a specific acceleration (for example radial or tangential acceleration) within a predetermined time interval (for example sliding mean value) can be a parameter derived from such an acceleration parameter. In particular, for example, a parameter which is representative of a wheel rotation speed (and therefore also, for example, of the speed of the vehicle in question), for example a parameter which is proportional to the wheel rotation speed, can be provided as derived parameter.

The previously mentioned switchover depending on the acceleration parameter or a parameter derived therefrom firstly has the advantage that such an acceleration parameter, in respect of the energy harvesting (from mechanical energy on a rotation of the vehicle wheel in question) used according to the disclosure, generally also represents a measure of the amount of electrical energy obtainable by the energy harvesting, and secondly has the advantage that, in the case of many electronic wheel units of the type of interest here, such an acceleration parameter or parameter derived therefrom is determined in any case by the control device (in particular, for example, for a determination of the wheel rotation speed), with the result that this parameter can be used for implementing the disclosure as well without any more complexity being involved.

The relevant parameter used for actuating the switchover operations can in particular be used, for example, as a parameter which is averaged over time (for example a sliding mean value), wherein a time interval over which the averaging takes place can be, for example, at least 1 s.

The switchover depending on the acceleration parameter or a parameter derived therefrom can be configured such that, for example, when the relevant parameter exceeds a predetermined first threshold value, a switchover of the electrical power supply to the wheel unit to the energy-harvesting device takes place, and that when this parameter falls below a predetermined second threshold value, a switchover of the electrical power supply to the wheel unit to the electric battery takes place. The two threshold values can in this case be preset, for example, to be equal in magnitude or else can be preset to be different in magnitude. Preferably, at least one of the two threshold values (in particular both threshold values) has at least 1.1 times, in particular at least 1.2 times that value of the parameter above which sufficient generation of electrical energy by the energy-harvesting device is to be expected. On the other hand, each of the two threshold values (in particular both threshold values) can be, for example, at most 1.5 times, in particular at most 1.4 times this parameter value.

In a preferred embodiment, provision is made for the control device to also be designed for implementing the actuating device. The control device can have, for example, a program-controlled computer device (for example microcontroller or the like), by means of which then, for example, not only the wheel operational data to be transmitted can be generated (calculated) but advantageously also an actuating signal for the switch can be generated. In a first variant embodiment of this embodiment, the control device generates the actuating signal. In a second variant embodiment, the actuating device is formed separately from the control device, but receives information and/or commands from the control device which are taken into consideration by the actuating device in the generation of the actuating signal.

As an alternative to this embodiment, the control device and the actuating device could, however, also be implemented by functionally separate devices.

In one embodiment, provision is made for the wheel unit to furthermore have a voltage measurement device for measuring an electrical voltage generated by the energy-harvesting device, wherein the actuating device effects the switchover depending on this voltage.

In the case of an AC voltage generation by the energy-harvesting device, in particular, for example, a mean absolute value ("rms AC voltage") of the AC voltage can be used as this voltage, wherein the averaging can be provided possibly over a relatively long (in comparison with the frequency of the change in mathematical sign or in comparison with the frequency of the generated AC voltage) time interval. As an alternative, for example, a mean value of a rectified version of a voltage originally generated as an AC voltage by the energy-harvesting device can also be used as this voltage. In both cases, a time interval over which the averaging takes place can be, for example, at least 1 s.

In one development, an electrical energy storage device, for example a rechargeable electric battery, is provided at one output of the energy-harvesting device for buffer-storing the electrical energy generated by the energy-harvesting device. Therefore, for example, an output voltage of the energy-harvesting device which is ultimately (after rectification) provided as a DC voltage can be buffer-stored, which advantageously enables a slightly "more sluggish" switchover strategy, which is therefore easier to manage. The energy storage device can in particular be dimensioned in such a way that the energy stored therein after complete charging covers the energy demand (or a maximum energy demand) of the wheel unit for at least 1 s, in particular at least 5 s. On the other hand, it is usually sufficient if this energy covers the energy demand (or maximum energy demand) of the wheel unit for a maximum of 30 s, in particular a maximum of 15 s.

The switchover depending on the measured voltage can be configured such that, for example, when the generated voltage exceeds a predetermined first threshold value, a switchover of the electrical power supply to the wheel unit to the energy-harvesting device takes place, and that when the generated voltage falls below a predetermined second threshold value, a switchover of the electrical power supply to the wheel unit to the electric battery takes place. The two threshold values can in this case be preset, for example, to be equal in magnitude or else can be preset to be different in magnitude. Preferably, at least one of the two threshold values (in particular both threshold values) has at least 0.9 times, in particular at least 1 times a rated voltage of the electric battery. On the other hand, each of the two threshold values (in particular both threshold values) can be, for example, at most 1.4 times, in particular at most 1.2 times, this rated voltage.

Once again returning to the previously mentioned first and second threshold values (which can possibly be selected to be equal in magnitude) above or below which the corresponding switchover operation is effected, provision is made in accordance with one development for at least one of the threshold values (preferably both of them) to not be fixedly preset, but rather to be preset depending on an operating state of the electronic wheel unit.

This development can be provided both for the explained parameter threshold values and for the explained voltage threshold values.

The development takes into account the circumstance whereby the electronic wheel unit can have a plurality of different operating modes which differ from one another in terms of their electrical energy consumption, with the result that, in this case, for example, the first threshold value (above which there is switchover to the energy-harvesting device) and/or the second threshold value (below which there is switchover to the electric battery) can, in time phases of an operating mode with a relatively high energy demand, be preset to be higher than in time phases of an operating mode with a relatively low energy demand.

As an operating mode with a relatively high energy demand, in particular, for example, an operating mode can be provided in which relatively often (i.e., in relatively short time intervals) a detection of the at least one wheel operational parameter and/or relatively often a transmission of the radio data signal takes place.

The radio device used in the disclosure can transmit the radio data signal for example in accordance with a current radio standard such as, for example, Bluetooth or the like.

The frequencies with which the detections and/or the transmissions take place can be fixed or controlled, for example, by the control device in accordance with an operational strategy (for example implemented by control software running thereon) of the electronic wheel unit.

As an operating mode with a relatively low energy demand, in particular, for example, an operating mode can be provided in which relatively rarely (i.e., in relatively long time intervals) a detection and/or relatively rarely a transmission of the radio data signal takes place. This may be in particular, for example, a so-called rest operating mode (for example in the case of a parked vehicle), in which no detections for generating wheel operational data and no radio transmissions take place, but rather only (and, for example, in relatively long time intervals) detections for detecting a beginning vehicle journey take place in order to set (i.e., "wake up") the electronic wheel unit to a normal operating mode with regular detections for the generation of wheel operational data in the case of such a detection.

In one embodiment of the disclosure, the wheel unit is also designed to effect the electrical power supply necessarily by means of the electric battery in the case of a beginning of a journey of the vehicle (beginning of a driving cycle) for a specific time interval.

This advantageously takes account of the circumstance whereby at the start of a driving cycle it is usually not yet possible for sufficient energy to be provided from the energy-harvesting device. The electronic wheel unit (or its control device) can in these cases temporarily (i.e. for the specific time interval) deactivate the use of the "switchover criterion" in question and first set the electrical power supply from the electric battery.

The determined time interval can be defined, for example, by a fixedly preset time period (of, for example, at least 30 s, in particular, for example, at least 60 s). As an alternative (or in addition), the time interval can be defined, for example, also by a (for example fixedly) preset number (for example more than 10, in particular, for example, more than 20) of radio data signals (for example "data telegrams") transmitted after the start of the journey.

Up until a start of a journey, the electronic wheel unit can be, for example, in a so-called rest mode (parking mode), wherein, directly after the start of the journey, a mode change takes place into another operating mode, for example, a "learning mode", in which, for example, a so-called localization of the electronic wheel units takes place, i.e., the respective installation positions of the individual wheel units on the vehicle are determined by a vehicle-side device (cf., for example, DE 10 2009 059 788 A1 or DE 10 2015 212 945A1). Only after the time interval (for example transmission of a specific number of telegrams, for example 40) has elapsed is the switchover criterion in question (for example acceleration parameter, vehicle speed, etc.) then used. Therefore, advantageously in a particularly reliable manner, the learning (localization process) is ensured.

In one embodiment, the electronic wheel unit, for example as a wheel-side component of a tire pressure monitoring system (TPMS for short) for arrangement in an air-filled tire of the vehicle wheel is provided, wherein the at least one sensor of the wheel unit comprises a tire pressure sensor in order to transmit wheel operational data containing information on the tire pressure to a vehicle-side radio receiver on the basis of the detected tire pressure by means of the radio data signals. As an alternative or in addition, in this case further information can be transmitted to the vehicle, such as, for example, in respect of a tire temperature and/or a wheel rotation position and/or wheel rotation setting.

BRIEF DESCRIPTION OF THE DRAWINGS

The disclosure is described in more detail below on the basis of exemplary embodiments with reference to the accompanying drawings, in which, in each case.

DETAILED DESCRIPTION

Figure 1:
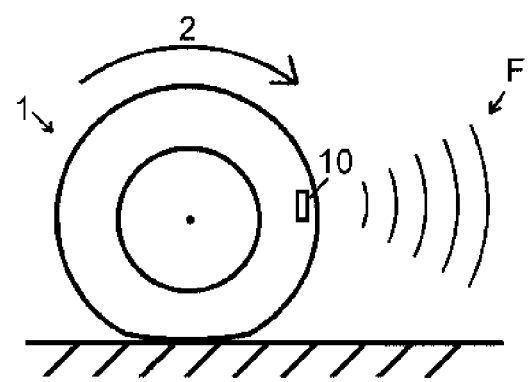
FIG. 1 shows a schematic side view of a vehicle wheel having an electronic wheel unit arranged therein in accordance with one exemplary embodiment.

FIG. 1 shows a vehicle wheel 1 of a vehicle (not illustrated) such as, for example, a passenger vehicle, on which an electronic wheel unit 10 is arranged in order to thereby obtain wheel operational data during a journey of the vehicle and to transmit said wheel operational data by radio to a receiver device arranged on the vehicle. In FIG. 1, a wheel rotation 2 is symbolized by an arrow, and a radio data signal F transmitted by the wheel unit 10 is illustrated.

In the example illustrated, the electronic wheel unit 10 is arranged, for example adhesively bonded or latched in an adhesively bonded holder, on an inner side of a contact surface of an air-filled tire of the vehicle wheel 1.

Figure 3:
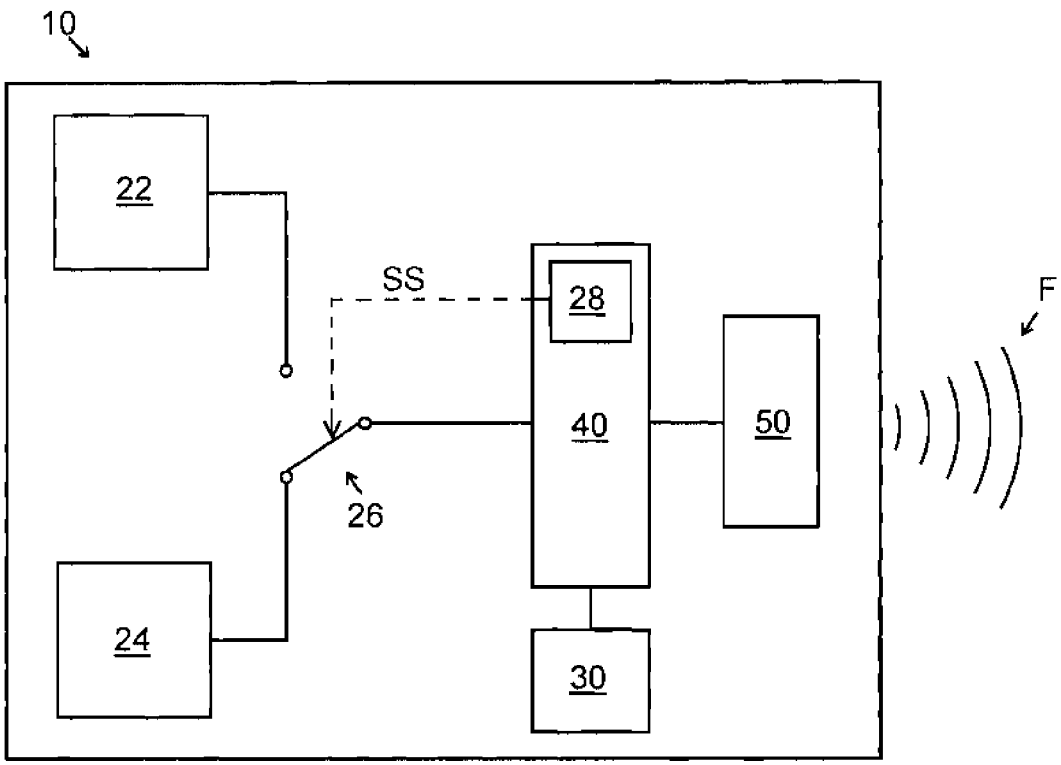
FIG. 3 shows a block circuit diagram of an electronic wheel unit in accordance with one exemplary embodiment.

FIG. 3 shows a block circuit diagram of an electronic wheel unit 10 usable in the example from FIG. 1 in accordance with one exemplary embodiment.

The wheel unit 10 has at least one sensor 30 for detecting at least one wheel operational parameter (for example acceleration, tire pressure, tire temperature, etc.), wherein preferably a plurality of corresponding sensors (for example acceleration sensor, pressure sensor, temperature sensor, etc.) is provided, but in FIG. 3, for reasons of the simplicity of the illustration, only one sensor is illustrated.

The wheel unit 10 furthermore has a control device 40, which is designed to generate corresponding wheel operational data on the basis of the at least one detected wheel operational parameter. The control device 40 is, within the context of the disclosure, preferably in the form of a program-controlled electronic control device (for example microcontroller), on which a control program for controlling the operation of the control device 40 runs.

In the example illustrated, the wheel operational data are calculated on the basis of the at least one wheel operational parameter by means of such a control program, for which purpose the sensor 30 or each of the sensors provided outputs a sensor signal, which is representative of a respective wheel operational parameter, to the control device 40.

The wheel operational data generated by the control device 40 can contain information on the wheel operational parameter(s) and/or other information derived therefrom relating to the wheel operation.

Suitable evaluation of a sensor signal which is representative of a wheel operational parameter "acceleration" (for example radial acceleration) allows, for example, the determination of a rotation speed and/or rotation position of the vehicle wheel 1, and therefore the inclusion of corresponding information in the wheel operational data.

The wheel unit 10 furthermore has a radio device 50 for transmitting the radio data signals F containing the wheel operational data to a radio device (not illustrated) of the vehicle in question.

Preferably, the radio device 50 of the wheel unit 10 is designed for bidirectional data communication, i.e., both for transmitting the radio data signals F to the radio device of the vehicle and for receiving radio data signals which are transmitted from the radio device arranged on the vehicle (for example in accordance with the Bluetooth standard). For example, reading of data from the electronic wheel unit 10 can be initiated by means of the latter radio data signals, for example by workshop personnel or, for example, by a central control unit of the vehicle. As an alternative, for example, also the operation of the control device 40 can be modified by such received radio data signals. It is therefore also possible for, for example, vehicle operational parameters (for example vehicle speed, etc.) or other information (for example tire information data) to be transmitted to the electronic wheel unit 10 for the purpose of taking them into consideration during operation of the control device 40.

The wheel unit 10 furthermore has a power supply device 22, 24 for supplying electrical power to the wheel unit 10 which has both an energy-harvesting device 22 for converting mechanical energy captured on a rotation of the vehicle wheel 1 into electrical energy and a non-rechargeable electric battery 24 (for example lithium battery).

The wheel unit 10 is designed to provide the electrical power supply by means of the energy-harvesting device 22 in the case of a sufficient generation of electrical energy by the energy-harvesting device 22 and to provide the electrical power supply by means of the electric battery 24 in the case of insufficient generation of electrical energy by the energy-harvesting device 22.

Therefore, both a long period of operational readiness of the electronic wheel unit 10 and a continuous electrical power supply is advantageously enabled.

In the exemplary embodiment illustrated, the wheel unit 10 has a switchover device 26, 28 for switching over between the energy-harvesting device 22 and the electric battery 24 as the energy source for the electrical power supply to the wheel unit 10.

The switchover device 26, 28 in the example is formed by an actuatable switch 26 and an actuating device 28, which outputs an actuating signal SS for actuating the switch 26. The switch 26 can be designed to have one or, for example, two poles, for example from a corresponding number of transistors actuated by the actuating signal SS.

The actuating device 28 in the exemplary embodiment illustrated is implemented as a functional constituent part of the control device 40, i.e., the control device 40 is in this case also used for generating the actuating signal SS.

In this case, the control device 40 requires information in respect of whether the generation of electrical energy by the energy-harvesting device 22 is sufficient or insufficient for supplying electrical power to the wheel unit 10.

There are various possible ways of obtaining this information. One possibility consists in that at least one detected wheel operational parameter and/or one parameter derived from at least one detected wheel operational parameter is used for this purpose by the control device 40 (or the control program running thereon), and the switchover between the two power supplies is effected depending on the at least one acceleration parameter or parameter derived therefrom.

In a more particular configuration, the at least one wheel operational parameter comprises an acceleration parameter (for example radial acceleration, tangential acceleration or acceleration with a different orientation at the attachment location of the electronic wheel unit 10), and the control device 40 or the functional components 28 thereof effects the switchover depending on this acceleration parameter or a parameter derived therefrom (for example rotation speed of the vehicle wheel 1).

If, as in the exemplary embodiment illustrated, the radio device 50 is designed for a bidirectional radio data communication with the vehicle (for example central control unit in the vehicle), as an alternative or in addition to the use of a wheel operational parameter detected by the electronic wheel unit 10 itself (and/or a parameter derived therefrom), it is also possible for information which is transmitted via radio data signal from the vehicle to the electronic wheel unit 10 to be used. An example of this would be the transmission of information on the vehicle speed from the vehicle to the electronic wheel unit 10 so that the electronic wheel unit 10 effects the switchover of the switch 26 depending on the vehicle speed thus determined.

For example, at relatively low vehicle speeds of, for example, less than a specific threshold value, for example 30 km/h, or, for example, 20 km/h, it would be possible for switchover to take place to an electrical energy supply by the electric battery 24 by means of the actuating signal SS, whereas, when such a predetermined threshold value (speed threshold value) is exceeded, the electrical energy supply is switched over to the energy-harvesting device 22.

In one embodiment of the disclosure, the actuating device 28 or in this case in the example the control device 40 is designed to effect the electrical power supply to the wheel unit 10 by means of the electric battery (independently of the subsequently used switchover criterion, in this case, for example, vehicle speed) at the start of each driving cycle of the vehicle in question (for example detectable from a beginning of a wheel rotation).

In the following description of further exemplary embodiments, the same reference symbols are used for functionally identical components. In this case, essentially only the differences from the exemplary embodiment(s) already described are discussed and otherwise express reference is hereby made to the description of previous exemplary embodiments.

Figure 4:
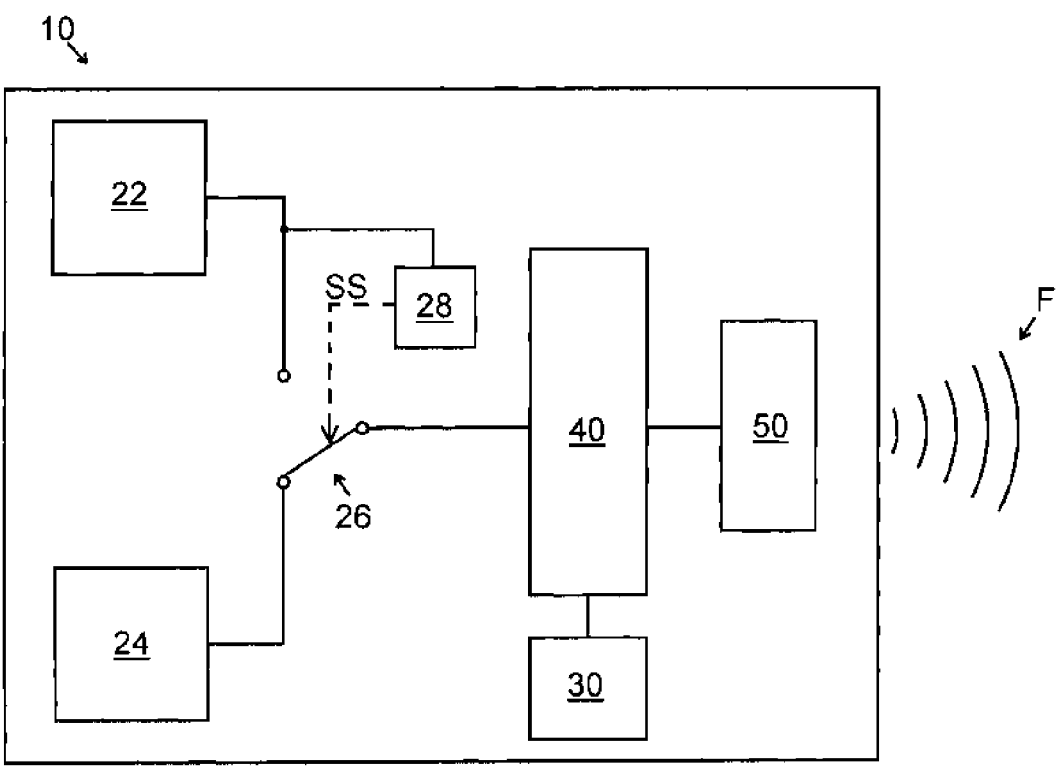
FIG. 4 shows a block circuit diagram of an electronic wheel unit in accordance with a further exemplary embodiment.

FIG. 4 shows a further exemplary embodiment of an electronic wheel unit 10, which has the same components as have been described already with reference to FIG. 3. In contrast to the example from FIG. 3, in the case of the wheel unit 10 from FIG. 4 the actuating device 28 is not implemented by the control device 40, however, but by a functionally separate device. Independently of this, a further difference in the wheel unit 10 from FIG. 4 consists in that the actuating device 28 the actuating signal SS is not formed depending on a wheel operational parameter detected by means of the sensor 30 (and/or further sensors) or a parameter obtained in another way by the control device 40, but rather the actuating device 28 has a voltage measurement device for measuring the electrical voltage generated by the energy-harvesting device 22, wherein the actuating device 28 effects the switchover depending on this voltage.

The switchover depending on the measured voltage can be configured such that, for example, when the generated voltage exceeds a predetermined first threshold value, a switchover of the electrical power supply to the wheel unit 10 to the energy-harvesting device 22 takes place, and that when the generated voltage falls below a predetermined second threshold value, a switchover of the electrical power supply to the wheel unit 10 to the electric battery 24 takes place. The two threshold values can be equal in magnitude, for example.

As a deviation from the example in accordance with FIG. 4, a voltage measurement device used in this way could also be provided as a (peripheral) component of the control device 40. A further modification of the example in FIG. 4 would be, for example, an actuating device 28 which is provided (as illustrated) separately from the control device 40 but which generates the actuating signal SS used for the switchover not on the basis of a voltage measurement, but rather on the basis of (or with consideration of) information (for example on the wheel rotation speed or the vehicle speed) transmitted by the control device 40 to the actuating device 28 and/or with consideration of commands which are output by the control device 40 to the actuating device 28. For example, the control device 40 could thus effect the electrical power supply necessarily by means of the electric battery at the beginning of a driving cycle for a specific time interval.

The electronic wheel units 10 of the type described with reference to FIGS. 3 and 4 can be provided in particular for arrangement in an air-filled tire of the vehicle wheel in question, wherein the at least one sensor 30 comprises a tire pressure sensor. In this case, the wheel unit 10 can represent the wheel-side component of a tire pressure monitoring system (TPMS) of the vehicle.

The previously mentioned threshold values above or below which a switchover operation is initiated, whether they be, for example, threshold values for an acceleration parameter, for the wheel rotation speed, for the vehicle speed (FIG. 3) or, for example, for an electrical voltage measured at the energy-harvesting device 22 (FIG. 4), can be preset in dependence on an operating state of the electronic wheel unit 10 in accordance with one development.

Figure 2:
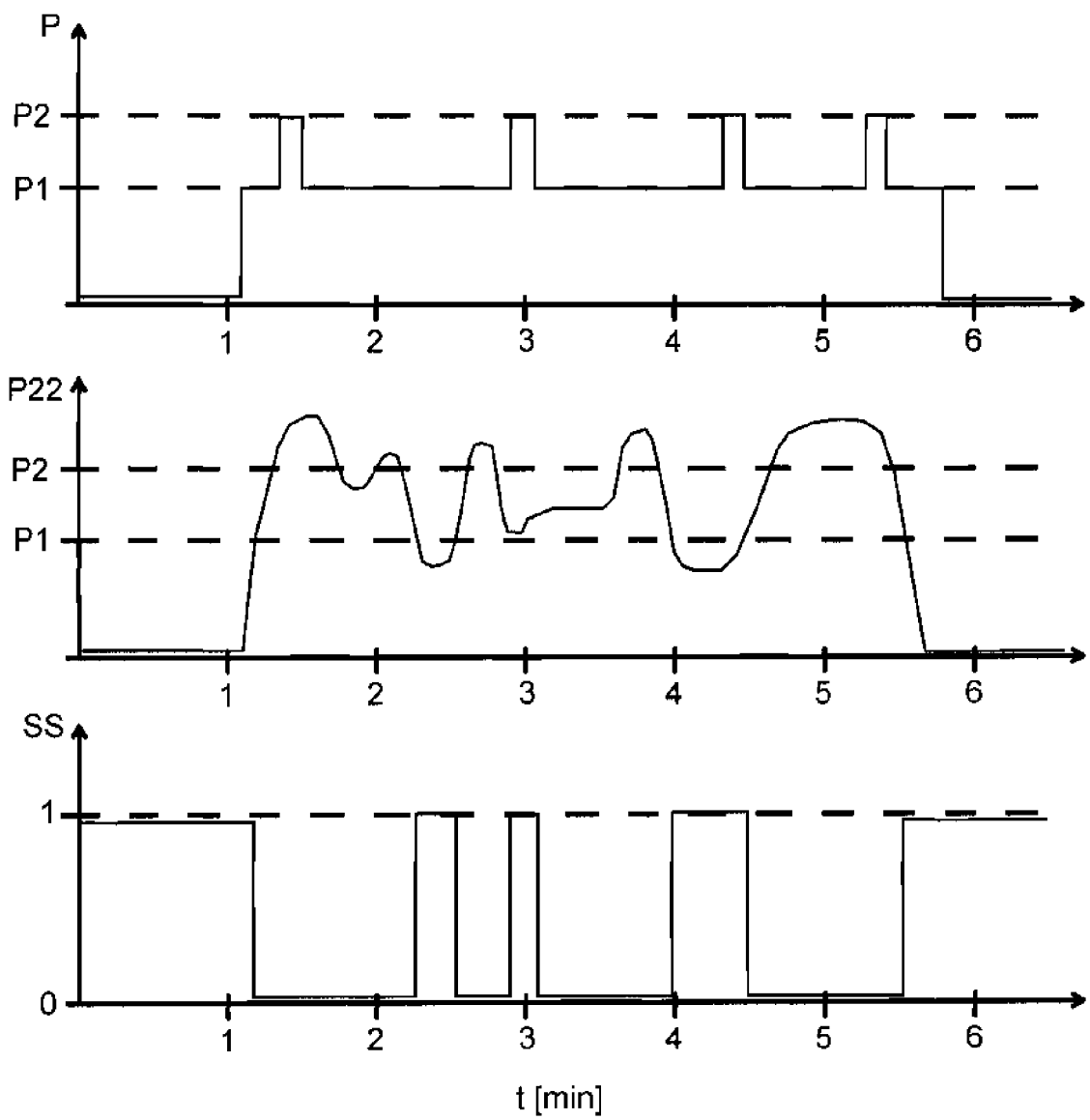
FIG. 2 shows an exemplary time characteristic graph for illustrating switchover operations in an electronic wheel unit.

FIG. 2 illustrates, using an exemplary time characteristic graph, switchover operations in an electronic wheel unit 10 of the type described here.

FIG. 2 shows, in subgraphs from the top to the bottom, in each case over time t, the characteristics of an electrical power P required by the electronic wheel unit 10 for the operation thereof (FIG. 2 at the top), an electrical power P22 generated by the energy-harvesting device 22 (FIG. 2 in the center) and an actuating signal SS generated on the basis thereof (FIG. 2 at the bottom).

In the example illustrated, it is assumed that, when the vehicle is parked, the wheel unit 10 is first of all (time t=0) in a "rest mode" and is supplied power from the electric battery 24.

At time t=1 min, a journey of the vehicle begins, which is detected by the wheel unit 10 (for example from a detected acceleration parameter and/or a wake-up signal received from the vehicle), whereupon the wheel unit 10 is set to a "normal operating mode" with a considerably increased electrical power demand (for example at t=1.1 min).

In the normal operating mode, the electrical power demand P of the wheel unit 10 then fluctuates in the example between a first value P1 and a comparatively increased second value P2. The power P1 is required for the operation of the at least one sensor 30 for detecting the wheel operational parameter(s) and/or calculations on the basis thereof for generating the wheel operational data and/or other evaluations by the control device 40, whereas from time to time an additional energy demand arises owing to the transmissions of the radio data signals F which are then taking place, which temporarily results in the increased power demand P2.

The power P22 which is generated by the energy-harvesting device 22 and is illustrated by way of example in FIG. 2 is dependent in practice, for example, very significantly on the instantaneous vehicle speed, wherein it can be seen from the relevant subgraph (FIG. 2 in the center) that the generated power P22 is sufficient in some time intervals for covering the power demand P and is insufficient (i.e., is not sufficient) for this in other time intervals. For the time intervals in which there is insufficient generation of electrical energy by the energy-harvesting device 22, the (logic) actuating signal SS changes from a value of "1" (for an energy supply from the electric battery 24) to a value of "0" (for an energy supply from the energy-harvesting device 22).

Advantageously, the implementation of the disclosure does not presuppose any precise knowledge of the electrical powers P and P22 illustrated in FIG. 2 during the operation of the wheel unit 10. On the contrary, a threshold value of a suitably selected parameter (for example acceleration parameter or parameter derived therefrom, vehicle speed, electrical voltage, etc.) above and below which it can be expected that an energy supply to the wheel unit 10 by the energy-harvesting device 22 is sufficient or is not sufficient can be determined in advance empirically (possibly for each of a plurality of different operating modes) for the electronic wheel unit 10 and the energy-harvesting device 22 used therein.

The invention claimed is:

1. An electronic wheel unit for arrangement on a wheel of a vehicle, the electronic wheel unit comprising:
   a sensor configured to detect an acceleration parameter of the wheel;
   an energy-harvesting device configured to convert mechanical energy captured on a rotation of the wheel into electrical energy;
   an electric battery; and
   a controller configured to select a controller configured to select a power source from among the energy-harvesting device and the electric battery based on the acceleration parameter sensed by e sensor and to provide electrical energy from the power source to the electronic wheel unit.

2. The electronic wheel unit as claimed in claim 1, wherein the control device comprises:
   a switch configured to select from among the energy-harvesting device and the electric battery; and
   an actuating device configured to actuate the switch based on the acceleration.

3. The electronic wheel unit as claimed in claim 1 wherein the acceleration parameter is an acceleration averaged over time.

4. The electronic wheel unit as claimed in claim 1, wherein the electric battery comprises a rechargeable electric battery provided at an output of the energy-harvesting device.

5. The electronic wheel unit as claimed in claim 1, wherein the one sensor comprises a tire pressure sensor and an acceleration sensor.

* * * * *

UNITED STATES PATENT AND TRADEMARK OFFICE
CERTIFICATE OF CORRECTION

| | |
|---|---|
| PATENT NO. | : 11,932,061 B2 |
| APPLICATION NO. | : 17/759670 |
| DATED | : March 19, 2024 |
| INVENTOR(S) | : Michael Löffler |

It is certified that error appears in the above-identified patent and that said Letters Patent is hereby corrected as shown below:

On the Title Page

After: (65) Prior Publication Data
US 2023/0079930 A1 Mar. 16, 2023

Insert: --(30) Foreign Application Priority Data
Jan. 29, 2020 (DE) ............... 10 2020 201 026.9--

Signed and Sealed this
Sixteenth Day of April, 2024

Katherine Kelly Vidal
*Director of the United States Patent and Trademark Office*